United States Patent [19]

Lindler et al.

[11] 4,061,806
[45] Dec. 6, 1977

[54] FLEXIBLE HOLLOW FISHING ROD

[75] Inventors: James Monroe Lindler, Lexington; Michael Taras Romanyszyn, Jr., Columbia, both of S.C.

[73] Assignee: Shakespeare Company, Columbia, S.C.

[21] Appl. No.: 675,713

[22] Filed: Apr. 12, 1976

[51] Int. Cl.² .................. B32B 7/02; B32B 17/12
[52] U.S. Cl. ................................. 428/35; 43/18 R;
43/18 GF; 273/DIG. 7; 273/DIG. 23;
428/213; 428/332; 428/367; 428/377; 428/392;
428/417; 428/902
[58] Field of Search ............... 428/36, 377, 902, 388,
428/413, 417, 408, 367, 378, 35, 213, 332; 43/18
A, 18 GF; 273/DIG. 7, DIG. 23, 80 R

[56] References Cited
U.S. PATENT DOCUMENTS 2,749,643  6/1956  Scott ........................... 428/36

FOREIGN PATENT DOCUMENTS 1,261,541  1/1972  United Kingdom ............. 273/80 R
1,349,906  4/1974  United Kingdom .......... 273/DIG. 7

Primary Examiner—George F. Lesmes
Assistant Examiner—P. J. Thibodeau
Attorney, Agent, or Firm—Hamilton, Renner & Kenner

[57] ABSTRACT

A flexible hollow fishing rod shaft of improved strength to weight ratio with respect to both bending and crushing strength, having an outer layer of longitudinally extending fiber glass filaments bonded together with a flexible plastic resin, and an inner layer of graphite filaments wound in a tight helix and impregnated with a plastic resin bonding agent.

5 Claims, 2 Drawing Figures

FLEXIBLE HOLLOW FISHING ROD

BACKGROUND OF THE INVENTION

Certain fishing rods have for a number of years been made of fiber glass filaments in a tapered shape and adapted to bend into a parabolic contour in response to the pull of a fish. In order to reduce weight and increase flexibility, a tubular rod is ordinarily preferred, and U.S. Pat. No. 2,749,643 discloses a rod having an outer layer of longitudinally extending glass fibers and an inner layer of close helically wound glass fibers, all of the fibers being bonded together by a suitable flexible plastic resin. The outer fibers are said to serve as tension and compression members yieldingly to resist bending of the rod and the inner fibers provide hoop strength to maintain a circular cross section and resist crushing, and thus maintain uniform radial spacing of the outer fibers from the neutral axis to obtain maximum bending resistance in those fibers. As far as we are aware, such rods have been lacking in resistance to transverse crushing loads, such as occur when the rod is inadvertently stepped on or is closed in a car door, and often prematurely fail when sharply bent.

More recently, tapered hollow rods have been produced having an inner layer of helically wound graphite filaments and an outer layer of longitudinally extending graphite filaments. However, due to the fact that the graphite filaments have a modulus of elasticity approximately three times that of glass fibers, it is difficult to obtain requisite flexibility and proper bending contour under load, which is attempted by cutting of or graduating the outer longitudinal filaments and thus simultaneously gradually reducing the thickness of the outer layer in the direction of the smaller end of the rod. This construction provides a rod that is considerably lighter than all glass tubular rods previously discussed and with comparable, but not markedly increased, strength.

SUMMARY OF THE INVENTION

We have discovered that a lightweight, and unexpectedly strong rod of optimum bending characteristics and hoop strength can be obtained by utilizing an outer layer of bonded longitudinal glass fibers of substantially less thickness than the outer layer in U.S. Pat. No. 2,749,643, and an inner layer of close helically wound graphite filaments impregnated with a plastic resin bonding agent. Contrary to what might logically be expected, both the bending strength and the hoop strength or crushing strength of the rod is increased.

It is an object of the present invention to provide an improved flexible hollow fishing rod which has increased bending strength and reduced weight.

Another object is to provide an improved flexible hollow rod which has increased crushing or compressive strength with reduced weight.

A further object is to provide an improved lightweight flexible hollow rod which utilizes an outer layer of longitudinal glass fibers of minimal thickness and an inner layer of helically wound graphite filaments.

These and other objects are accomplished by the improved hollow fishing rod shaft comprising the present invention, a preferred embodiment of which is by way of example in the accompanying drawings and described in detail in the following specification. Various modifications and changes in details of construction are comprehended within the scope of the appended claims.

DESCRIPTION OF A PREFERRED EMBODIMENT

Figures 1, 2:
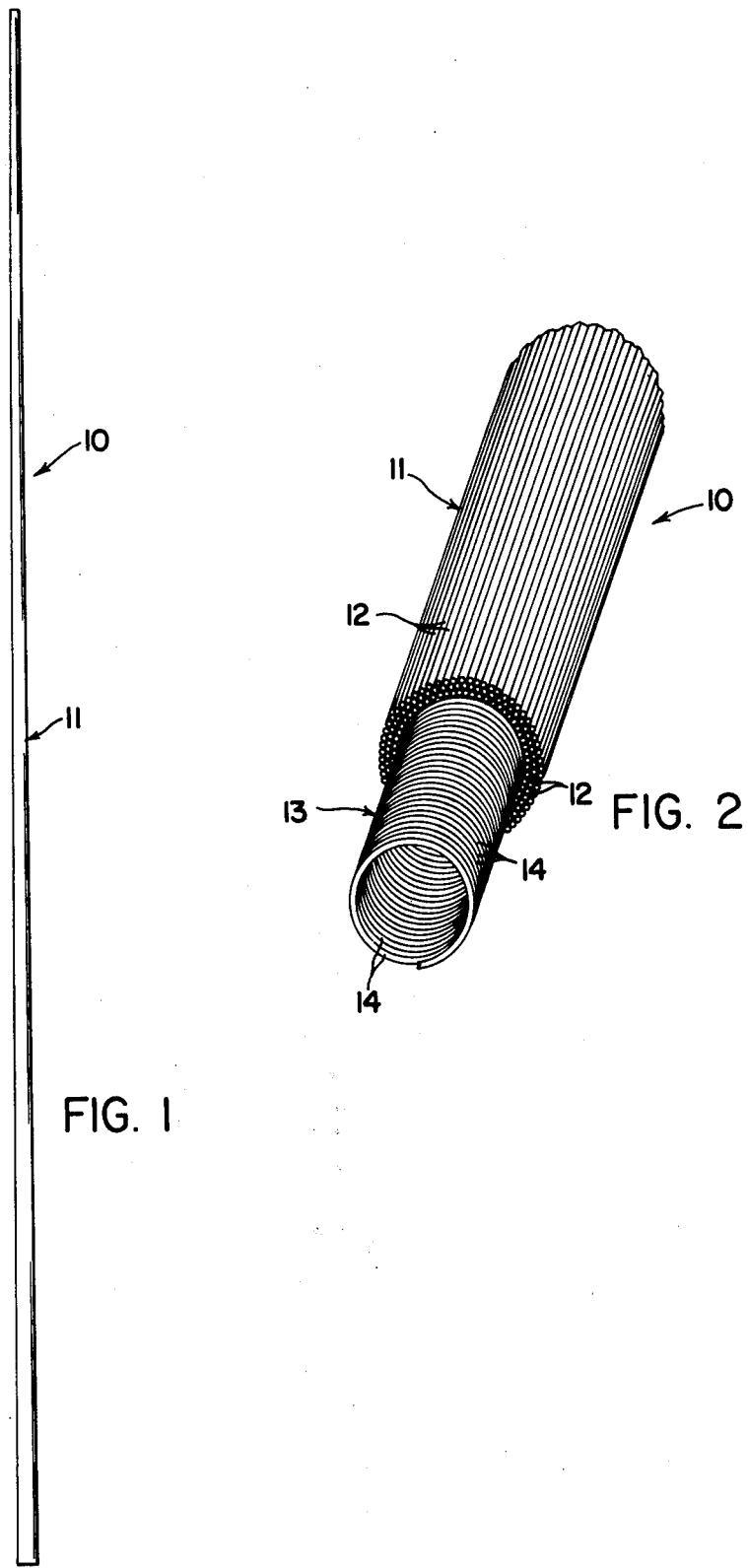
FIG. 1 is a side elevation of a tapered hollow fishing rod shaft embodying the invention.
FIG. 2 is an enlarged schematic perspective view of a section of the shaft, partly broken away to show the disposition of the filaments of the inner and outer layers.

The tapered fishing rod shaft 10 may be of various lengths as desired, and is hollow to at least within a foot or less from the tip, as indicated in FIG. 2. The outer layer 11 comprises a multiplicity of contiguous fiber glass filaments 12 extending longitudinally of the shaft. These filaments are extremely fine and may be of the order of 0.00038 inches in diameter. In the preferred embodiment the requisite glass filaments are provided by the use of roving although one skilled in the art might substitute a glass fabric for the roving if that fabric provided comparable strands oriented longitudinally of the shaft.

The inner layer 13 comprises graphite filaments 14 wound in a tight helix within and contiguous to the outer layer 11. These filaments may be those produced by Union Carbide Corp. under the trademark "THORNEL 300" or graphite filaments similar thereto, and may be of the order of 0.00031 inches in diameter. The wall thickness of the graphite layer is relatively uniform throughout the medial length of the rod — i.e., that portion of the rod length along which bending failures normally occur — but may terminate within a short distance from the tip of some rods inasmuch as bending failures seldom, if ever, occur in the tip portion. On the other hand, the wall thickness of the fiber glass layer may gradually increase toward the tip section. Nevertheless, the average thickness through the medial length of the rod will often vary from approximately 0.02 inches to 0.0335 inches. Thus, the radial thickness of the outer fiber glass layer is approximately seven to eleven times that of the inner graphite layer.

In the drawing the dimensions of both the filaments 12 and 14 are exaggerated for the sake of clarity.

Before forming the outer and inner layers 11 and 13, the fiber glass filaments 12 and the graphite filaments are coated with a suitable bonding agent such as an epoxy resin. The contiguous filaments are bonded together and cured by the application of heat after the layers have been formed one upon the other. After curing, the other layer volume comprises about 60% fiber glass filaments and 40% resin, and the inner layer volume comprises about 60% graphite filaments and 40% resin.

A number of specimens of shafts constructed according to this invention were tested to failure in bending against a number of shafts of substantially the same length, taper and inner diameter and constructed according to U.S. Pat. No. 2,749,643, in which the outer layer had the same longitudinal fiber glass filaments, but the inner layer was tightly wound helical filaments also of fiber glass. Measured at the same relative position, the average outer diameter of the specimen shafts according to this invention was approximately 0.472 inches and the average outer diameter of the fiber glass specimens was approximately 0.488 inches. The test specimens constructed according to this invention employed an anhydride epoxy resin to coat the fiber glass filaments 12 and an amine epoxy resin to coat the graphite filaments 14.

The tests comprised holding the large end of the rod stationary and applying an increasing load to the small end, causing it to bow into a loop contour. The results of these tests were as follows:

| Load to Break in Pounds | | | |
|---|---|---|---|
| Present Construction | | Fiber Glass Inner Layer | |
| Specimen | Pounds | Specimen | Pounds |
| 1 | 21.5 | 1 | 17.5 |
| 2 | 21.0 | 2 | 17.5 |
| 3 | 20.5 | 3 | 8.5 |
| 4 | 15.0 | 4 | 16.5 |
| 5 | 16.0 | 5 | 6.25 |
| 6 | 17.5 | 6 | 20.0 |
| 7 | 16.0 | 7 | 6.5 |
| 8 | 22.0 | 8 | 16.0 |
| 9 | 21.5 | 9 | 16.0 |
| 10 | 21.5 | 10 | 7.5 |
| 11 | 20.5 | 11 | 10.0 |
| 12 | 15.5 | 12 | 12.0 |
| 13 | 20.5 | 13 | 17.5 |
| 14 | 20.0 | | |
| Average | 19.2 | Average | 13.2 |

Contrary to expectations, these tests clearly show a substantial increase in bending strength in the improved constructions.

Further comparative tests were made on the two constructions in respect to the so-called hoop strength or resistance to radial compression. These tests were made by positioning 1 inch long sections of the large ends of specimen rods of both constructions between parallel flat plates with the axis of the section parallel to the plates and applying an increasing pressure transversely of the plates. The results of these tests were as follows:

| COMPRESSIVE STRENGTH PRESENT CONSTRUCTION | | | | |
|---|---|---|---|---|
| Specimen | Length | O.D. | I.D. | Ultimate Load (Pounds) |
| 1 | 1.003 | .474" | .412" | 91.0 |
| 2 | 1.004 | .471" | .412" | 88.0 |
| 3 | 1.002 | .472" | .410" | 78.5 |
| 4 | 1.002 | .475" | .411" | 100.0 |
| 5 | 1.003 | .472" | .411" | 89.0 |
| 6 | 1.003 | .471" | .410" | 88.5 |
| 7 | 1.004 | .470" | .410" | 84.0 |
| 8 | 1.003 | .473" | .411" | 92.5 |
| 9 | 1.003 | .472" | .408" | 83.5 |
| 10 | 1.004 | .470" | .409" | 93.0 |
| 11 | 1.004 | .470" | .409" | 102.5 |
| 12 | 1.003 | .472" | .408" | 85.0 |
| Average | | .472" | .410" | 89.2 |

| FIBER GLASS INNER LAYER | | | | |
|---|---|---|---|---|
| Specimen | Length | O.D. | I.D. | Ultimate Load (Pounds) |
| 1 | 1.002 | .482" | .412" | 54.0 |
| 2 | 1.002 | .493" | .412" | 47.0 |
| 3 | 1.009 | .490" | .412" | 52.0 |
| 4 | 1.004 | .480" | .411" | 52.0 |
| 5 | 1.005 | .492" | .411" | 64.0 |
| 6 | 1.003 | .492" | .411" | 54.0 |
| 7 | 1.003 | .491" | .410"+ | 67.0 |
| 8 | 1.004 | .480" | .410" | 56.0 |
| 9 | 1.003 | .491" | .411" | 54.0 |
| 10 | 1.003 | .490" | .409" | 76.0 |
| 11 | 1.004 | .491" | .410" | 66.0 |
| 12 | 1.002 | .479" | .409" | 52.0 |
| Average | | .488" | .410" | 57.8 |

The improved results shown by these tests were also wholly unexpected.

The composite glass graphite shaft of this invention (although having a 20% smaller wall thickness than the all glass shaft) exhibited a 45% higher loading to ultimate flexural failure and a 54% higher loading to ultimate failure in compression perpendicular to the axis of a shaft, than did the all glass shaft, as shown in the foregoing test results.

As shown by the compressive strength tests, the average wall thickness of the fiber glass specimens was 0.039 inch and of the graphite-fiber glass specimens 0.031 inch. The wall thickness of the fiber glass specimens was approximately 8% of the O.D. and of the graphite-fiber glass specimens approximately 6½% of the O.D. The average weight of the fiber glass specimen rods was 57 grams and that of the graphite-fiber glass rods was 44 grams.

Accordingly, a new and improved hollow fishing rod has been provided which has increased bending and compressive strength with reduced weight.

We claim:

1. A flexible hollow fishing rod shaft of circular cross section having only two layers, an outer layer comprising at least longitudinally extending fiber glass filaments bonded together with a flexible plastic resin, and an inner layer of graphite filaments wound in a tight helix and impregnated with a flexible plastic resin, the radial thickness of the fiber glass layer being approximately seven to eleven times the thickness of the graphite layer.

2. A flexible hollow fishing rod shaft as described in claim 1 in which the wall thickness of the rod is approximately 6½% of its maximum outside diameter and the ultimate bending strength at the intermediate portion of the shaft is about 19.2 pounds.

3. A flexible hollow fishing rod shaft as described in claim 2 in which the outer layer comprises 60% fiber glass filaments and 40% resin by volume, and the inner layer comprises 60% graphite filaments and 40% resin by volume.

4. A flexible hollow fishing rod shaft as described in claim 1, in which the radial thickness of the fiber glass layer is about 0.02 to 0.0335 inches.

5. A flexible hollow fishing rod shaft as described in claim 4 in which the outer layer comprises 60% fiber glass filaments and 40% resin by volume, and the inner layer comprises 60% graphite filaments and 40% resin by volume.

* * * * *